Patented Sept. 11, 1934

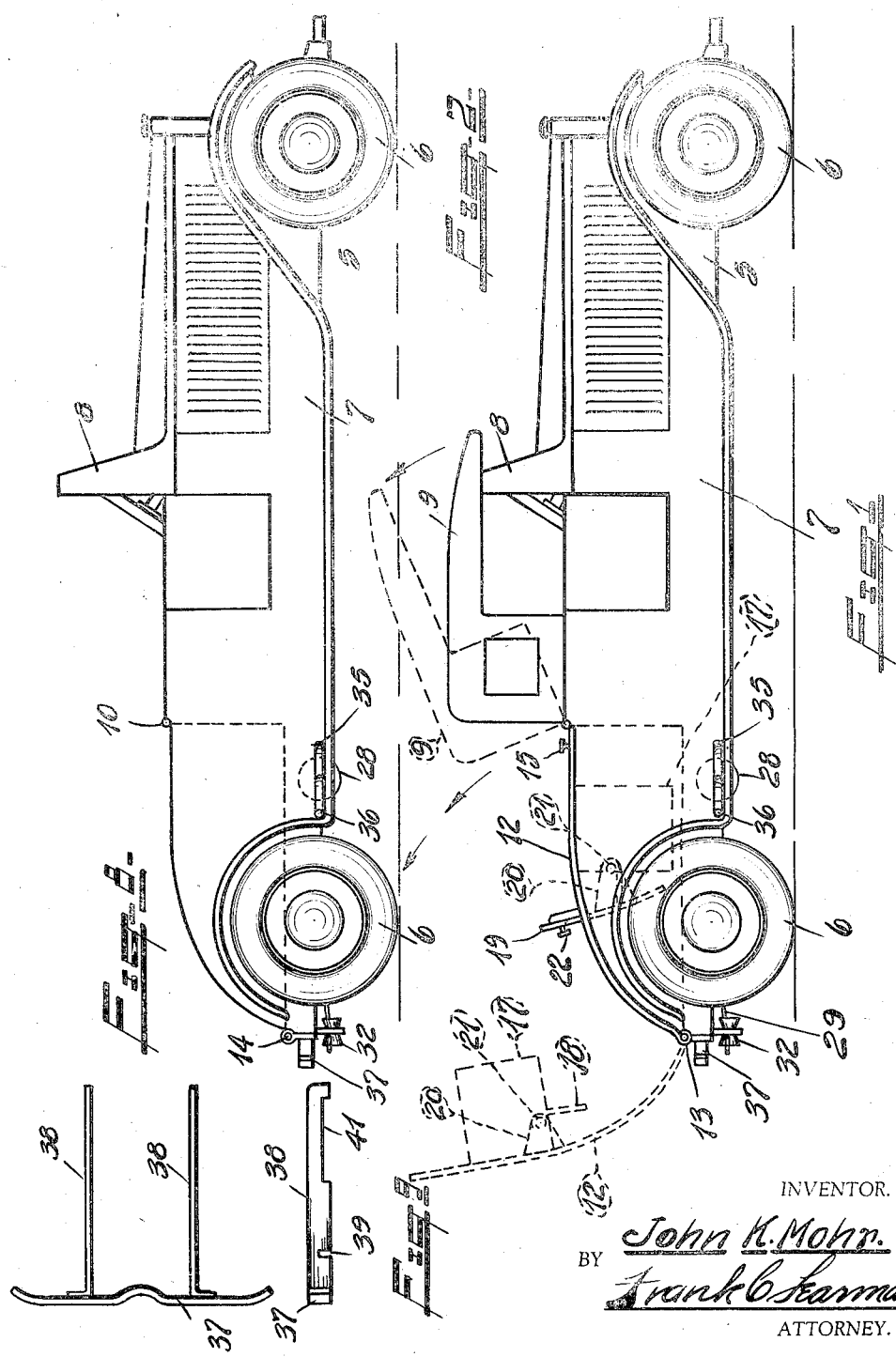

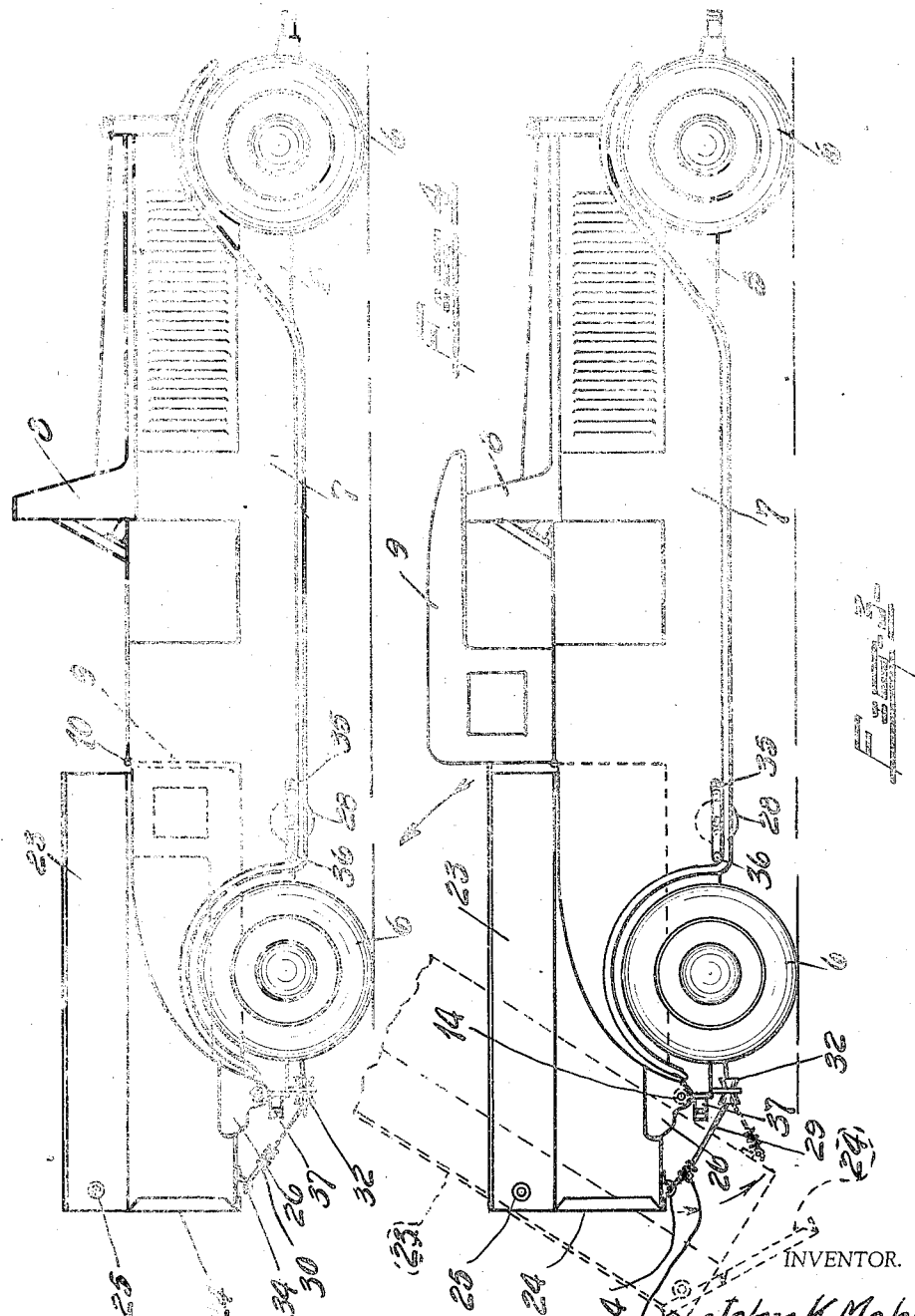

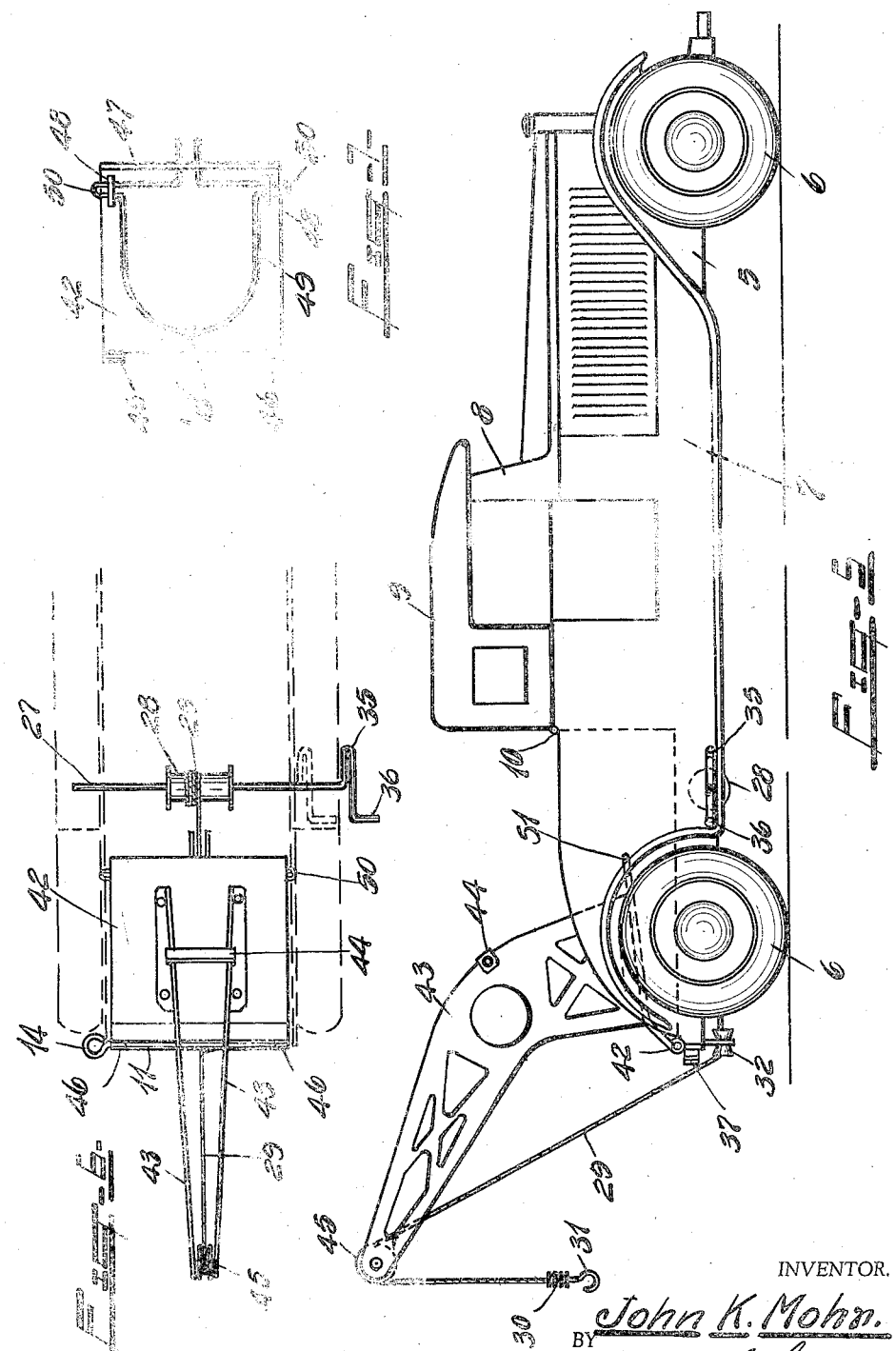

1,973,220

UNITED STATES PATENT OFFICE 1,973,220

CONVERTIBLE TOY VEHICLE

John K. Mohr, Bay City, Mich.

Application December 27, 1932, Serial No. 648,909

8 Claims. (Cl. 46—48)

This invention relates to toy vehicles, and more particularly to a vehicle which can be converted to form bodies of various types and designs.

One of the prime objects of the invention is to design a vehicle body having a convertible rigid top structure, which when in raised position represents a closed coupé, and which can be swung down into the body so that it is completely concealed from view to form an open job.

Another object is to provide a body having a hinged removable rear deck which can be quickly and easily detached to permit a dump body, box, crane, or similar structure to be mounted in position, so that a dump body is provided, either with or without a closed cab (depending on the position of the top), the top when in folded position in no manner interfering with the mounting or operation of the dump box.

A further object is to provide a body provided with a detachable rear deck having a foldable rumble seat structure, which can be readily opened and closed regardless of the position of the rigid top proper.

A still further object is to provide simple and practical dump box actuating means so that the dump box can be easily operated, and further provide means for limiting the travel of the box when it is being swung to dumping position.

A further object still is to provide a dump box actuating means, said means also serving as the hoist line for the crane, or a tow rope, or for any other desired purpose.

The above and other objects will appear as the specification progresses, reference being had to the accompanying drawings, in which I have shown the preferred embodiment of my invention, and in which like reference numerals indicate like parts throughout the several views thereof.

In the drawings—

Fig. 1 is a side view of my improved vehicle, the solid lines showing the top in raised position to form a closed coupé, with the rumble seat open; the dotted lines showing the top being swung backwardly into the body, with the rear deck swung upwardly to permit said movement, the rumble seat being closed.

Fig. 2 is a view similar to Fig. 1 with the top swung down to form an open job.

Fig. 3 is a side view showing the rear deck removed and a dump box in position, the dotted lines showing the box in dumping position with the tail gate open.

Fig. 4 is a similar view showing the top swung down to provide an open dump job.

Fig. 5 is also a similar view with a crane mounted on the body.

Fig. 6 is a top plan view of the crane and winding mechanism the broken lines indicating the body outline.

Fig. 7 is an inverted plan view of the crane base plate.

Fig. 8 is a detail of the rear bumper mechanism.

Fig. 9 is an edge view thereof.

It is particularly desirable that toys be so designed and constructed that they serve the purpose as a useful toy, and also that they provide knowledge and experience in the field represented thereby, and I have, therefore, designed a convertible toy automobile on which various body designs, cranes, and similar apparatus can be quickly and easily mounted or removed so that a variety of designs is available, the opening and closing of the rumble seat presenting still different body lines in the open and closed pleasure car design.

Referring now more particularly to the drawings, the numeral 5 indicates the chassis of the vehicle, which is provided with ground engaging wheels 6 as usual. A body 7 is mounted on this chassis, and includes a windshield and frame 8, and a rigid top 9 is hingedly connected to the body by means of hinges 10, so that the top can be swung down into the body when converting from a closed to an open job.

A transversely disposed elongated bearing 11 is provided on the rear end of the frame, and a rear deck 12 is hingedly connected thereto, spaced apart bearings 13 being provided on the deck, and when in proper position register with the bearing 11 to accommodate and receive an elongated pin or rod member 14. A handle 15 is also provided on the forward end of the deck, and when it is desired to swing the top down into the body to provide an open job, it is first necessary to swing the deck upwardly to position as shown in dotted lines in Fig. 1 of the drawings, when the top can be swung upwardly and back into the body, the rear end of the body being of a width sufficient to receive and accommodate said top.

A rumble seat 16 is provided in the rear deck and comprises a boxlike compartment 17 provided with a rearwardly projecting flange 18 which forms a seat, the section 19 of the rear deck forming the cover for the rumble when closed, and forming the back rest of the seat when open. Legs 20 are provided on opposite edges of this back section, and these legs are pivotally connected to the compartment at the point 21 to permit said back to freely swing, a handle 22 being provided as shown to facilitate the opening and closing of the rumble seat.

The rear deck can be easily and quickly removed to permit a dump body to be mounted in position, and in Figs. 3 and 4 of the drawings, I have shown the vehicle converted to form a dump body, Fig. 3 showing the top in raised position, the dotted lines illustrating the dump box in its dumping position.

The dump box 23 can be of any desired shape and is provided with a rear door or tail gate 24 which is pivotally connected to the side walls by means of pivot pins 25, said gate being free to swing outwardly so that the load may be dumped. Depending brackets 26 are secured to the side walls of the dump box, and suitable openings are provided therein and accommodate the rod or pin 14 which secures the dump box in position.

A transversely disposed shaft 27 is mounted on the chassis of the vehicle, and a spool member 28 is mounted on said shaft, one end of a cord or cable 29 being anchored to the spool, the opposite end being secured to a spring 30, and a hook 31 is secured to the opposite end of the spring, thence the cord leads rearwardly through a bell-shaped guide 32 which is mounted on the frame, and thence the hook 31 is connected to a hook 34 provided on the bottom of the dump body.

The one end of the shaft 27 projects through the side of the frame just above the running board of the vehicle, and is bent as shown at 35, the end of the shaft terminating in a handle 36, and when it is desired to wind the cable on the spool, the shaft 27 is pulled outwardly to position shown in solid lines in Fig. 6 of the drawings, so that the bent section 35 clears the running board, and the crank can then be actuated to wind the cord on the spool, and when the shaft is forced inwardly, the bent section engages the running board and holds the mechanism in position.

An adjustable bumper member is provided on the rear end of the vehicle, and comprises a transversely disposed bar 37 having spaced apart longitudinally disposed members 38 secured thereto, these members being notched as shown at 39 and project through suitable opening 40 provided in the end frame, said bars projecting over the axle and being notched as at 41 so as to provide for the limited longitudinal movement, the notches 39 engaging the openings 40 to secure the bumper in position for limiting the downward swing of the body.

In Figs. 5 and 6 of the drawings, I have shown a wrecking crane attached to the body. This comprises a base member 42 to which the boom frame members 43 are secured, a brace 44 connecting said members in spaced apart relation, and a sheave 45 is mounted on the outer end of the boom, the hoist line 29 being trained thereover, so that the hook 31 can be attached to the article to be raised; the handle 36 is then actuated to rotate the spool 28, and the article can be raised as desired, and this same hoist line can be used as a tow line when it is desired to tow another vehicle.

The rear end of the base plate 42 is formed with spaced apart bearings 46 which receive the pin 14, so that it is readily interchangeable with the rear deck or dump box. A flange 47 is provided on the front end of the base plate, and guides 48 depend therefrom, a resilient wire 49 being welded or otherwise secured on the bottom of the plate at "B", said wire being looped as shown at 50, these loops being supported in the guides 48, thence the ends of the wire are bent at right angles and project through a slotted opening in the flange 47. Openings 51 are provided in the side walls of the vehicle body, and the looped sections 50 project thereinto, and by grasping the ends of the wire and forcing them towards each other, these loops will be withdrawn from the openings 51, so that the crane can be swung up to permit the top being swung down into the body, or the pin 14 can be withdrawn and the crane removed, and I wish to direct particular attention to the fact that the top can be converted without removal of any parts.

The device is simple and attractive, and it is particularly appealing as a toy, due to the fact that it can be converted to represent the variety of body designs, the converting of the top, the removal, replacement and operation of the rear deck, rumble seat, dump box, and crane being also educational to the child, as well as serving the purpose of a toy for which it is intended.

From the foregoing description it will be obvious that I have perfected a toy vehicle of neat and attractive appearance, which can be economically manufactured, which can be quickly assembled and converted, and which is of simple and sturdy construction.

What I claim is:

1. A convertible toy vehicle of the class described, and comprising a chassis having a body mounted thereon and provided with a convertible top, means for detachably mounting an auxiliary body apparatus on said body, a winding mechanism mounted on the chassis, and a cable attached thereto and to the auxiliary body apparatus.

2. A convertible toy vehicle of the class described, and comprising a chassis having a body provided with a hinged detachable deck and a convertible top, and an auxiliary body apparatus interchangeable with said deck, and having a common hinged securing means which permits the auxiliary body to dump its load.

3. A convertible toy vehicle of the class described, and comprising a chassis having a body mounted thereon, and provided with a detachable rear deck and a rigid top hingedly connected thereto and foldable rearwardly into said body, and an auxiliary body apparatus interchangeable with said deck and operable in any position of said top.

4. A convertible toy vehicle of the class described, and comprising a chassis, a body mounted on the chassis and provided with removable rear deck, a convertible top hingedly connected to the body and foldable rearwardly thereinto when the deck has been swung upwardly and out of position, said deck being removable and having a common securing means to permit the attachment of an auxiliary body apparatus when said deck is removed.

5. A convertible toy vehicle of the class described comprising a chassis having a body mounted thereon, and provided with a hinged detachable rear deck and a convertible top, an auxiliary body apparatus interchangeable with said rear deck and operable in any position of said top, and a common securing means for securing said deck or auxiliary body in position.

6. A convertible toy vehicle of the class described, and comprising a chassis having a body mounted thereon and provided with a hinged detachable rear deck and a convertible top, a dump box pivotally and detachably mounted on the body, a winding drum on the chassis, a line wound thereon and connected to said dump body, and means for actuating said winding drum.

7. A toy vehicle of the class described comprising a chassis having a body mounted thereon, and provided with a hinged detachable rear deck and a rigid convertible top, an auxiliary body apparatus adapted to be mounted on the body when the deck is removed, and common securing means for securing said auxiliary body apparatus in position to permit its operation in any position of said top.

8. The combination in a toy vehicle including a chassis having a body mounted thereon, and provided with a hinged and detachable rear deck, of an auxiliary body apparatus adapted to be mounted on said body and interchangeable with said rear deck, and a common hinged securing means for attaching said deck and body apparatus.

JOHN K. MOHR.